United States Patent [19]

Dannels et al.

[11] 4,309,379

[45] Jan. 5, 1982

[54] METHOD AND APPARATUS FOR RUNNERLESS INJECTION-COMPRESSION MOLDING THERMOSETTING MATERIALS

[75] Inventors: W. Andrew Dannels, Grand Island, N.Y.; Robert W. Bainbridge, Gainesville, Ga.

[73] Assignee: Hooker Chemicals & Plastics Corp., Niagara Falls, N.Y.

[21] Appl. No.: 164,412

[22] Filed: Jun. 30, 1980

Related U.S. Application Data

[63] Continuation-in-part of Ser. No. 972,189, Dec. 21, 1978, Pat. No. 4,238,181.

[51] Int. Cl.$^3$ ............................................. B29F 1/08
[52] U.S. Cl. ............................. 264/328.2; 264/328.7; 264/328.14; 264/328.16
[58] Field of Search ............ 264/328.7, 328.2, 328.14, 264/328.16

[56] References Cited

U.S. PATENT DOCUMENTS

| | | | |
|---|---|---|---|
| 3,591,897 | 7/1971 | Perras | 425/548 X |
| 3,632,729 | 1/1972 | Bielfeldt | 264/294 |
| 3,787,159 | 1/1974 | Bielfeldt | 425/167 |
| 3,807,921 | 4/1974 | Murgatroyd | 425/562 X |
| 3,819,312 | 6/1974 | Arpajian | 425/543 |
| 4,017,242 | 4/1977 | Mercer | 425/548 X |

FOREIGN PATENT DOCUMENTS

| | | | |
|---|---|---|---|
| 743854 | 10/1966 | Canada | 425/562 |
| 1487410 | 5/1967 | France . | |

OTHER PUBLICATIONS

European Plastic News, "Multi-Cavity Tools for Injection-Compression", vol. 5, No. 2, 1978, pp. 24 and 27.
Colored Thermosets Get Competitive, pp. 8-9.
Japan Plastics Age, vol. 13, No. 3, 1975, pp. 13, 20-24.
Japan Plastics Age, vol. 16, No. ½, 1978, pp. 19-22.

Primary Examiner—Thomas P. Pavelko
Attorney, Agent, or Firm—James F. Mudd; David A. Stein; Thomas T. Gordon

[57] ABSTRACT

A method and apparatus are described. A thermosetting molding material, suitably a synthetic resin composition such as a phenolic molding composition, is initially heated and plasticized. The plasticized mass is passed as a stream through an injection nozzle which is maintained at a temperature sufficiently high to keep the mass in a plasticized condition but sufficiently low to avoid any substantial curing or setting-up of the mass. The plasticized mass is next passed through a temperature-controlled manifold maintained at a temperature sufficiently high to keep the mass in a plasticized condition but sufficiently low to avoid any substantial curing or setting-up of the mass. In the manifold the plasticized stream is divided into two or more smaller streams which are passed through a plurality of outlets into a plurality of partially open, heated molds. The mold cavities are maintained at temperatures sufficiently high to cure the thermosetting molding material. When the partially open molds are full, the feed stream is interrupted, and the molds are then completely closed to press and cure the plasticized material enclosed within them. The cured, finished article is removed from the mold and the process repeated.

The apparatus of the present invention includes a stationary assembly and a movable assembly. The stationary assembly is comprised of a support plate which has a heat plate mounted thereon, a temperature-controlled manifold mounted on the heat plate and a plurality of mold faces positioned on the heat plate surrounding the periphery of the manifold. The movable assembly is comprised of a support plate which has a heat plate mounted thereon and a plurality of mold faces, corresponding to, and adapted to be aligned with the mold faces on the stationary assembly. Means are provided to move the movable assembly into close proximity with the stationary assembly to form partially open mold cavities. Means are provided to feed a supply of thermosetting molding material through the manifold into the partially open mold cavities. Means are also provided to completely close the mold cavities and for subsequent retracting the movable assembly to allow access to the mold face areas.

5 Claims, 5 Drawing Figures

METHOD AND APPARATUS FOR RUNNERLESS INJECTION-COMPRESSION MOLDING THERMOSETTING MATERIALS

REFERENCE TO PRIOR APPLICATION

This is a continuation-in-part of copending application Ser. No. 972,189, filed Dec. 21, 1978, now U.S. Pat. No. 4,238,181 issued Dec. 9, 1980.

BACKGROUND OF THE INVENTION

The present invention relates to a method and apparatus for molding thermosetting materials and, more particularly, to the molding of thermosetting synthetic resin compositions.

Injection molding is an advantageous method of forming articles of synthetic resin. In general terms, injection molding is a process wherein the molding composition, in a melted or plasticized state, is injected into a mold cavity. Typically, cold molding composition in granular or nodular form is fed from a hopper into a heated cylinder containing a screw. The molding composition is heated, melted and plasticized on the screw flights, and then the screw, acting as a ram, injects the melted and plasticized material into a mold cavity. In the case of thermosetting material, the molded material is cured in the mold by compaction and by heat added to the mold cavity. After curing, the article is ejected from the mold and the process repeated.

Injection molding offers the advantages of reduced molding cycles, better control of process variables, and increased productivity as compared with conventional compression and transfer molding processes. The major disadvantage with the injection molding of thermosetting materials is the generation of a considerable amount of waste material, particularly when multiple cavity systems are employed. The waste material is generated by thermosetting material that has cured, become infusible, in the runner and sprue systems and cannot be reused. The amount of non-reusable waste material generated in this fashion can be substantial, ranging typically from about 15 to about 80 percent of the total amount of material required to mold an article.

A more recent technical advance in the molding art has been the adaptation of the runnerless injection, or cold manifold, process to the injection molding of thermosetting resins. In the cold manifold process, the material in the sprue and manifold system is maintained at a temperature sufficient to maintain the material in a plasticized condition, without causing the material to prematurely cure or "set-up". Thus, when a cured part is removed from the mold cavity, the material in the sprue and manifold becomes part of the next molding, instead of being discarded as in conventional injection molding operations. The runnerless injection process, therefore, provides for significant savings in material.

The thermosetting materials usually employed in runnerless injection processes differ in some respects from materials normally employed in conventional injection processes because of the different requirements of each process. One significant difference is that a standard injection molding material typically has a stiffer plasticity for faster molding cycles. In contrast, a runnerless injection material is adapted to remain in a plasticized or fused condition in the feed system for extended periods of time without prematurely curing, usually at temperatures between about 104° and 116° C. (220° to 240° F.) while also being capable of rapidly curing in the mold cavity at the molding temperature, usually about 170° C. (340° F.). Examples of suitable runnerless injection molding compositions are described in U.S. Ser. No. 915,335, filed June 13, 1978, now abandoned, but refiled as applications Ser. Nos. 030,037 and 030,038, on Apr. 13, 1979. The disclosure in the referenced application is hereby incorporated by reference. Although such formulations are useful in the present invention, they are not required, and the molding compositions presently utilized may be selected from the more economical and more readily available standard thermosetting molding compositions.

Thermosetting molding materials useful in the present invention may suitably be selected from thermosetting synthetic resins and resin compositions typically used in molding operations, for example, phenolic; amino, such as urea, melamine and melamine/phenolic; polyester resins, including unsaturated polyesters, in granular, nodular, bulk or sheet forms; alkyd; epoxy; silicone; diallylphthalate; polyamides, or from thermosetting natural and synthetic rubber compositions. Phenolic resin compositions are especially useful as the feed material. Phenolic resin compositions used in molding operations are usually employed in the form of molding compositions. Phenolic molding compositions typically are particulate in form containing a molding grade phenolic resin, a cross-linking agent such as hexamethylenetetramine, and suitable filler materials.

The technique of injection-compression molding basically consists of injecting a charge of plasticized molding material into a partially open mold; the final fill, or mold fit, is accomplished by the subsequent complete closure of the mold. Injection-compression molding makes possible a combination of the positive attributes of compression molding, i.e., improved dimensional stability, uniform density, low shrinkage and impact strength, with the automation and fast cure of injection molding.

The present invention provides a method and apparatus for adapting the advantages of injection-compression molding to include the advantages of runnerless injection techniques and facilitates the use of standard phenolic molding compositions in such method and apparatus.

GENERAL DESCRIPTION OF THE INVENTION

In accord with the present invention, the thermosetting molding material, suitably a synthetic resin composition such as a phenolic molding composition, is initially heated and plasticized. The plasticized mass is then passed as a stream through a nozzle which is maintained at a temperature sufficiently high to keep the mass in a plasticized condition but sufficiently low to avoid any substantial curing or setting-up of the mass. The plasticized mass is then passed through a temperature-controlled manifold maintained at a temperature sufficiently high to keep the mass in a plasticized condition but sufficiently low to avoid any substantial curing or setting-up of the mass. By substantial curing or setting-up of the thermosetting molding material is meant the amount of premature polymerization which would adversely inhibit the plasticity or mobility of the molding material. In the manifold the plasticized stream is divided into two or more small streams which are passed through a plurality of runner channels, separate from the temperature-controlled manifold. The streams are subsequently injected to fill a plurality of partially open, heated molds. The mold cavities are maintained at temperatures sufficiently high to cure the thermosetting molding material. When the partially open molds are full, the feed stream is interrupted, and the molds are then completely closed to press and cure the plasticized material enclosed within them. The cured, finished article is removed from the mold and the process repeated. In an alternate mode of the invention, the plasticized material from the temperature-controlled manifold is fed directly from the manifold into the molds.

The direct, positive mold system of the present invention is comprised of two interfitting halves, or mold faces, which, when joined in register, define the mold cavity. The mold cavity, when fully closed, has the volume and configuration substantially identical to the desired finished molded article. In accord with the injection-compression technique employed in the present invention, the mold faces are not fully closed when the plasticized material is injected into the mold cavity. Thus, filling of the mold cavity is carried out against little or no backpressure. The mold faces are heated to a temperature sufficiently high to cure the thermosetting molding material. The mass that is enclosed within the mold should remain sufficiently plastic so that, upon complete closure of the mold, the material will flow to fill every part of the mold cavity.

The present invention also relates to apparatus particularly suited to use in carrying out the present method. The apparatus described more fully below, includes a distribution system for the plasticized material wherein the only scrap loss is a very short runner or gate. The distribution system comprises a stationary-temperature-controlled manifold in which the entering injection stream is divided or split into a plurality of streams to feed a plurality of mold cavities.

The present invention combines the positive attributes of runnerless injection and compression molding techniques which provides increased productivity and the production of products having improved capabilities. The present invention also provides an improved means to maintain the plasticized mass within the system in an uncured state for substantially longer periods of time than the distribution systems of the prior art. This is of particular importance when extra time is required to clean or clear a mold, or when the operation is interrupted because of equipment failure.

DETAILED DESCRIPTION OF THE INVENTION

The present invention will be illustrated and more fully described by reference to the accompanying drawings.

FIG. 1 is a cross-sectional, partly schematic view of an injection molding apparatus, particularly adapted to carry out the present process. As shown in FIG. 1, the apparatus is in the fill stage of the molding cycle. In this stage, thermosetting molding material is fed into partially open, heated molds.

FIG. 2 shows the apparatus of FIG. 1 in the compression stage. In this stage, the molds are completely closed. The thermosetting material within the molds is pressed and heated to cure the material into the mold shape.

As shown in FIG. 4, the apparatus is in the fill stage of the molding cycle.

As shown in FIG. 5, the apparatus is in the fill stage of the molding cycle.

Figure 1:
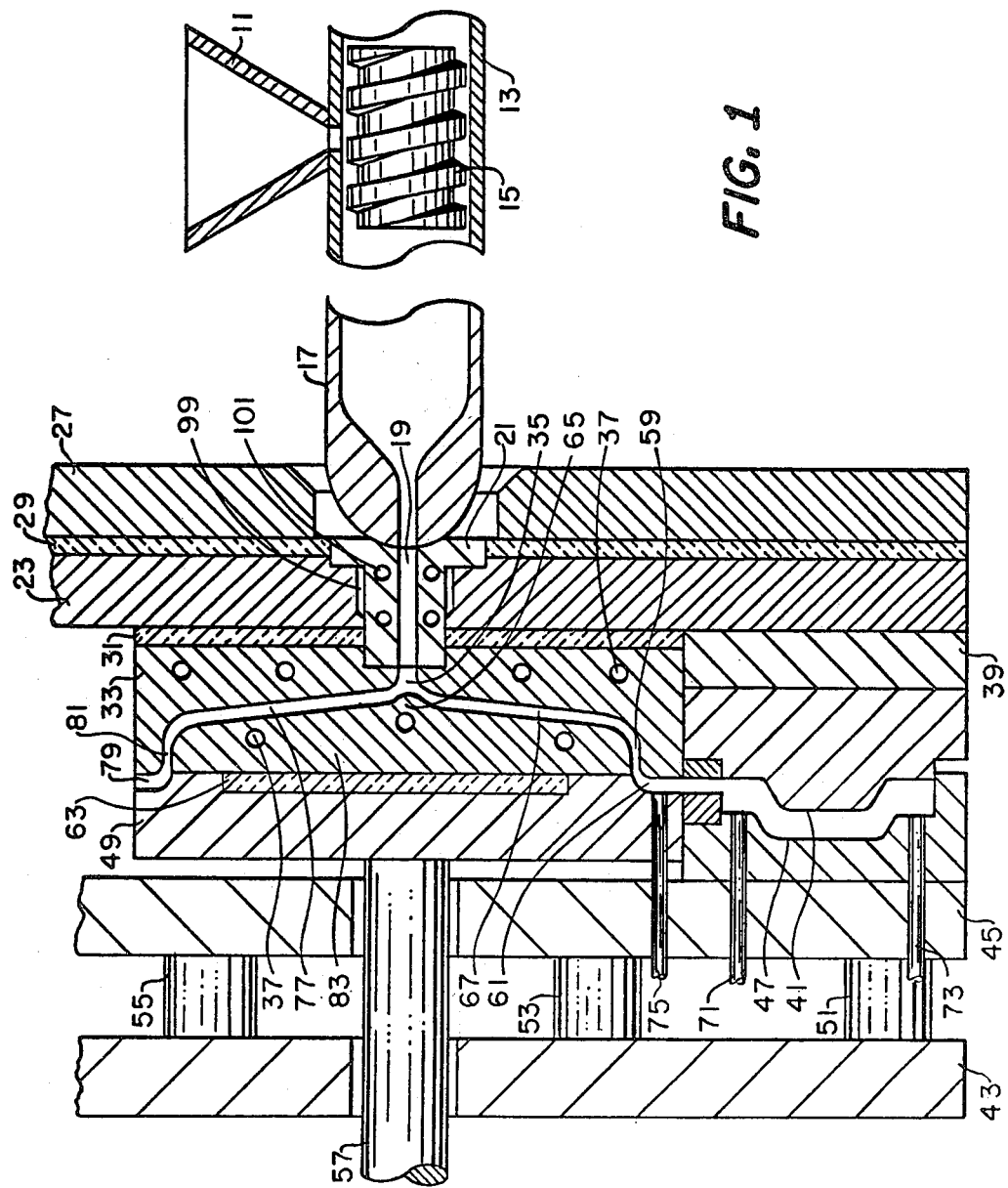

Looking now at FIG. 1, thermosetting molding material is fed into feed hopper 11 and then into a plasticizing zone formed by the interior of heated barrel 13 and by the mechanical working of screw 15. A predetermined amount of plasticized molding material is subsequently injected by screw 15 acting as a ram, through injection nozzle 17. The material passes through orifice 19 of sprue bushing 21 and into entry orifice 35 of a temperature-controlled manifold 33. Temperature-controlled manifold 33 is preferably fabricated with a removable section 83 to facilitate inspection and cleaning of the internal orifices of the manifold without removing the entire manifold from the machine. During the molding operation, manifold plates 33 and 83 are fastened together, such as with bolts. The contact face of manifold 33 has a plurality of outlet orifices, such as 59, connected by internal orifices, such as 67, to entry orifice 35. Plates 23, 39 and 45 are heated to a temperature sufficiently high to set the thermosetting molding material. Heating may be accomplished by circulation of steam or hot oil through the plates, but more suitably, electrically. Temperatures ranging between about 135° and about 216° C. (275° to 425° F.) are generally useful, and, within this range, temperatures between about 149° and about 199° C. (300° to 390° F.) are aptly suited to use to cure a wide variety of thermosetting materials. The temperature in manifold 33 is controlled by the circulation of a liquid, such as water, through orifices, such as 37. The temperature in the manifold is maintained sufficiently low to prevent any substantial curing of the thermosetting molding material and, at the same time, maintaining the material in a plasticized state. Generally, temperatures in the range between about 77° to about 121° C. (170° to 250° F.) and, more preferably, from about 99° to about 116° C. (210° to 240° F.) are maintained in the manifold member.

The principal purpose of the temperature-controlled manifold 33 is to prevent curing while maintaining plasticity of the thermosetting molding material. The principal purpose of heat plates 23, 39 and 45 is to supply sufficient heat to cure the material in the molding step. Manifold 33 thus provides a temperature-controlled zone which will prevent premature curing of the thermosetting material in the feed system prior to the molding cycle.

The present apparatus has a stationary assembly and a movable assembly. The stationary assembly is comprised of a stationary support plate, or platen member, 27 which has a stationary heat plate 23 mounted thereon. Suitably, heat plate 23 is fabricated to have substantially the same dimensions as support plate 27. Preferably, support plate 27 is separated from heat plate 23 by a layer of insulating material 29, e.g., insulating board. Temperature-controlled manifold member 33 is mounted on heat plate 23 and, preferably, is separated therefrom by a layer of insulating material 31, e.g., insulating board. Heat plate 23 also has an auxiliary heat plate 39 mounted thereon and positioned adjacent the periphery of manifold plate 33. Auxiliary heat plate 39, in turn, has a plurality of mold faces, such as 41, mounted thereon, also positioned adjacent the periphery of manifold plate 33. It will be understood that heat plate 23 an auxiliary heat plate 39 may be fabricated as a single unit; however, for ease of fabrication and conversion of presently available equipment, two-piece construction is preferred. The plates, manifold and mold faces of the present invention are aptly fabricated of metals, such as mold steels, stable under conditions of use. Heat is supplied to mold face 41 by heat plate 23 and auxiliary heat plate 39. The temperature maintained on the mold surface of mold face 41 is sufficiently high that, when combined with the pressure generated upon closing of the mold, will cure or set the thermosetting material within the mold cavity. Generally, temperatures in the range between about 135° and about 216° C. (275° to 425° F.) are useful and, within this range, temperatures between about 149° and about 199° C. (300° to 390° F.) are particularly useful for the curing of a wide variety of thermosetting molding materials.

The movable assembly consists of a movable support plate, or platen member, 43 which has a movable heat plate 45 mounted thereon. Heat plate 45 has a plurality of mold faces, such as 47, mounted thereon. Support blocks, such as 51, 53 and 55, are suitably utilized between support plate 43 and heat plate 45 to provide space to operate the knock-out pins 71, 73 and 75. They also serve to insulate support plate 43 from heat plate 45. Suitably, heat plate 45 is fabricated to be substantially the same dimensions as support plate 43. The movable assembly is adapted to be moved reciprocally as a unit, by means not shown, but suitably hydraulically, in and out of aligned contact with the corresponding mold faces on the stationary assembly.

Figure 2:
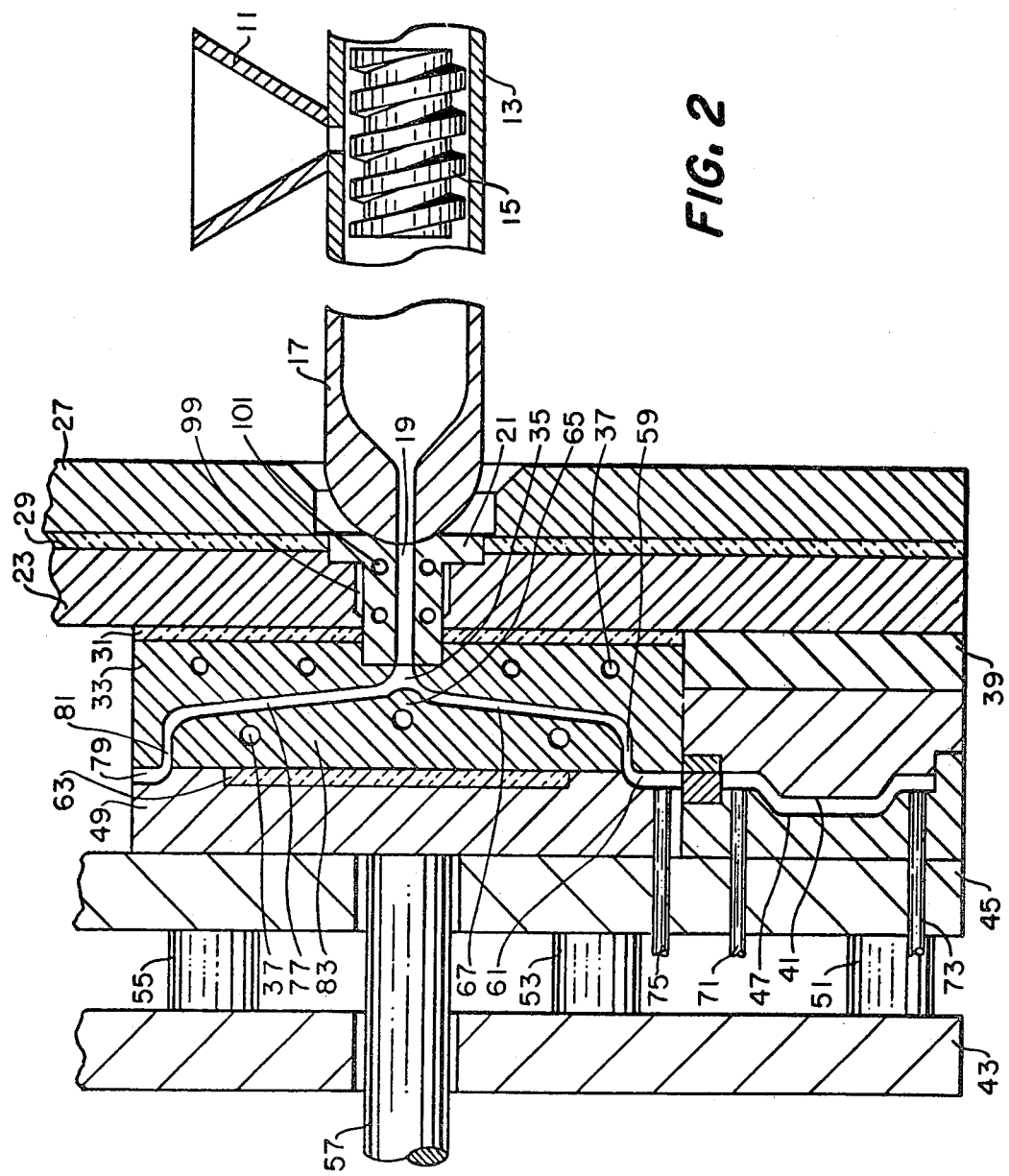
Figure 3:
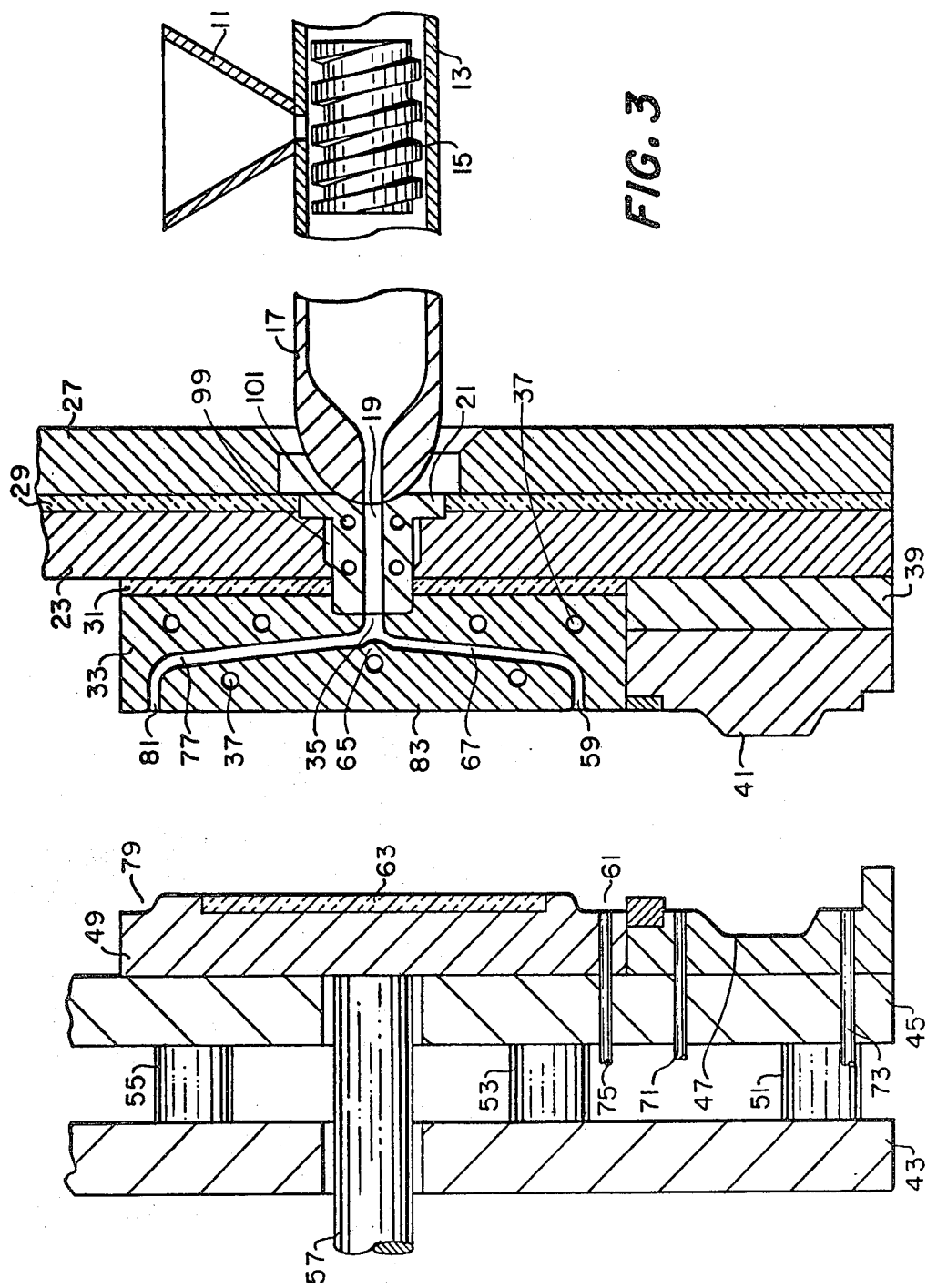
FIG. 3 shows the apparatus of FIG. 1 in an open position. In this position, the movable platen member has been actuated to move in a direction away from the stationary platen member to allow removal of the molded articles from the open mold and to facilitate cleaning of the mold faces in preparation for repositioning the machine components in the fill stage as shown in FIG. 1.

In the embodiment shown in FIGS. 1, 2 and 3, the apparatus includes a runner plate 49 which is independently movable. Runner plate 49 is heated, preferably electrically, to maintain a temperature corresponding to that of movable heat plate 45. Runner plate 49 is movable in and out of contact with the outer face of manifold 33 by reciprocal movement of rod 57 which is actuated by hydraulic means, not shown. The contact face of runner plate 49 has a plurality of passageways, such as 61 and 79, which is adapted to correspond to and be aligned with the outlet orifices, such as 59 and 81, in manifold 33 to form runner channels through which a flow of thermosetting material may be directed from temperature-controlled manifold 33 through the runner channels and into the mold cavity formed by the partially open mold faces, such as 41 and 47. Preferably, runner plate 49 has a layer of insulation, e.g., insulation board, 63 along at least a portion of its contact face.

Movable heat plate 45 and runner plate 49 maintain a temperature at mold face 47 comparable to that maintained on mold face 41, which is a temperature sufficiently high to cure thermosetting material upon complete closure of the mold. Upon complete closure of the mold, the temperature in runner channel 61 also rises to cure the thermosetting material in the runner channel.

The shot, or measured amount, of plasticized thermosetting molding material entering through nozzle 17 passes through sprue bushing 21, orifice 19, and into temperature-controlled manifold 33 through entry orifice 35. The plasticized molding material is then diverted by material distributor 65 into a plurality of orifices, such as 67. As shown in FIG. 1, the plasticized material then enters a runner channel, such as 61, and into the area between partially open mold faces 41 and 47. Spacing between the partially open mold faces generally ranges between about 0.06 and about 0.5 inches and, more preferably, between about 0.10 and about 0.2 inches. Openings less than about 0.06 usually do not allow easy flow of the molding material into the mold cavity, and openings greater than about 0.5 inches frequently yield an excess of flash in the area around the mold faces upon closure of the mold.

Upon filling of the mold cavity, mold faces 41 and 47 are then moved, suitably hydraulically, to close.

FIGS. 1, 2 and 3 illustrate another feature of the invention wherein sprue member 21 is separated from stationary heat plate 23 by space 99 to aid in preventing a temperature in the sprue member which would cure, or set up, the thermosetting molding material in sprue orifice 19. A further embodiment, illustrated in FIGS. 1, 2 and 3, is that sprue member 21 may also be provided with a temperature-control means, provided by orifices, such as 101, adapted to hold and circulate a reservoir of liquid, suitably water, maintained at a temperature sufficient to maintain the molding material in a plasticized state and insufficient to cause substantial curing of the molding material.

FIG. 2 shows the apparatus of FIG. 1 in a closed or compression stage of the molding cycle. Movable support plate 43 has moved toward stationary support plate 27 to close mold faces 41 and 47. Thermosetting molding material previously fed into the space between mold faces 41 and 47 is pressed and heated to cure the material enclosed in the mold. After the molding material is cured, the molds are opened by movement of the movable assembly in a direction away from the stationary assembly.

FIG. 3 shows the apparatus of FIG. 1 in an open position. In this position, temperature-controlled manifold 33 is disengaged from runner plate 49, and mold faces 41 and 47 are separated to facilitate removal of the molded article and to allow cleaning of the mold faces. Suitably, the molded article is removed from the mold by the action of one or more knock-out pins, such as 71 and 73, positioned in the mold face area. The only scrap of waste generated are small runners of molding material cured in the runner channels, e.g., 61. This material may be removed by action of a knock-out pin, such as 75.

It will be understood that the present invention provides for the use of a plurality of mold cavities fed by a single manifold, such as 33. The drawings contemplate, but do not show, additional mold capacity fed by orifices, such as 77, through additional runner channels, such as 79. Preferably, the molds positioned around the periphery of manifold 33 are balanced, that is, each of the molds requires substantially the same amount of plasticized material for filling.

Once the molded articles and cured runners are removed from the open molds, and the mold area is cleaned, the apparatus components are repositioned to the arrangement shown in FIG. 1. Runner cut-off 71 is then retracted, allowing the next charge of thermosetting material to be injected into the space between mold faces 41 and 47.

Figure 4:
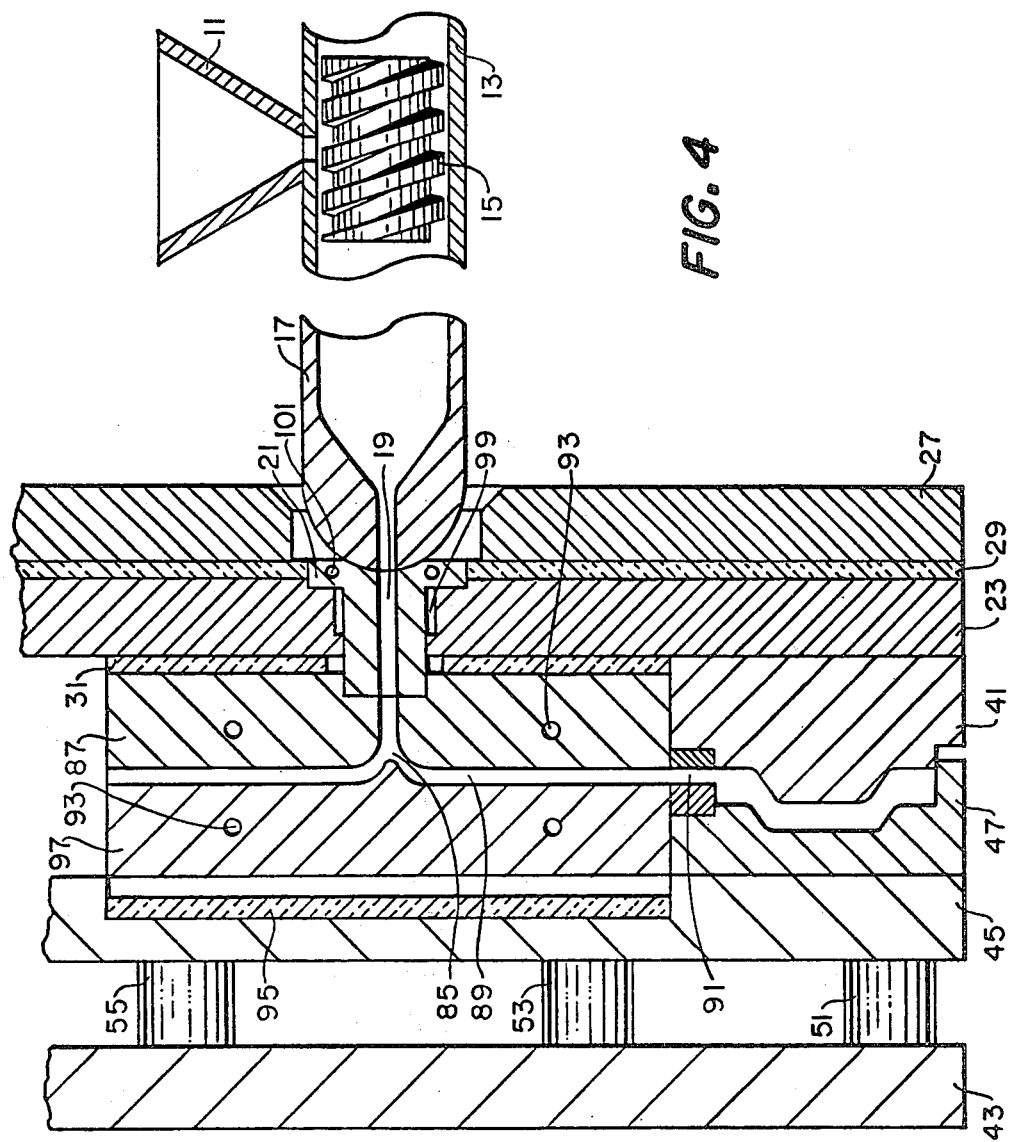
FIG. 4 is a cross-sectional, partly schematic view of an injection molding apparatus shown in an alternate embodiment wherein the manifold component feeds directly into the mold gates.

FIG. 4 shows an alternate embodiment of the apparatus shown in FIGS. 1, 2 and 3. In this embodiment, the temperature-controlled manifold directly feeds plasticized molding material into the gate area of a plurality of mold cavities positioned around the periphery of the manifold, eliminating the need for the independent runner plate 49 as shown in FIGS. 1, 2 and 3.

Looking now at FIG. 4 in detail, wherein the apparatus components similar to those shown in FIGS. 1, 2 and 3 are similarly numbered. Thus, plasticized thermosetting molding material is fed from heated barrel 13, passing through injection nozzle 17, through orifice 19 of sprue bushing 21, and into entry orifice 85 of manifold 87. Manifold 87 has a plurality of runner channels, such as 89, which connect internally with entry orifice 85 and exit along the periphery of manifold 87. Runner channels, such as 89, connect to gate area 91 of mold cavities formed by mold faces, such as 41 and 47.

Similar to the embodiment shown in FIGS. 1, 2 and 3, the embodiment in FIG. 4 includes a stationary assembly and a movable assembly.

The stationary assembly is comprised of a stationary support plate, or platen member, 27, which has a stationary heat plate 23 mounted thereon. Preferably, support plate 27 is separated from heat plate 23 by a layer of insulation 29, e.g., insulating board. Manifold 87 is mounted on heat plate 23 and is separated therefrom by a layer of insulation 31 suitably of insulating board. Heat plate 23 also has a plurality of mold faces, such as 41, mounted thereon surrounding the periphery of manifold 87. Outlet orifices or runner channels, such as 89, in manifold 87 connect with gate areas, such as 91, of the mold faces.

The movable assembly is comprised of a movable support plate, or platen member, 43, which has a movable heat plate 45 mounted thereon. Heat plate 45 has a plurality of mold faces, such as 47, mounted thereon. Support blocks, such as 51, 53 and 55, are suitably utilized to insulate support plate 43 from heat plate 45. The movable assembly is adapted to be moved reciprocally, suitably by hydraulic means, not shown, to place the mold faces on the movable assembly in and out of aligned contact with the mold faces of the stationary assembly. During the fill and compression stages of the molding cycle, manifold member 87 is preferably maintained out of direct contact with movable heat plate 45 by means of an insulating layer, 95, e.g., insulating board, positioned along the portion of the face of heat plate 45 which is contiguous to manifold member 87.

As shown in FIG. 4, the apparatus is in the fill stage of the molding cycle, that is, plasticized thermosetting molding material is fed from temperature-controlled manifold 87 into partially open mold cavities formed by mold faces 41 and 47. Manifold 87 has a temperature-controlling means therein comprised of internal channels, such as 93, which are adapted to hold and circulate a reservoir of liquid maintained at a temperature sufficiently high to maintain the thermosetting molding material in a plasticized state and sufficiently low that no substantial curing of the molding material takes place. Generally, temperatures in the range from about 77° to about 121° C. (170° to 250° F.) and, more preferably from about 99° to about 116° C. (210° to 240° F.) are used. Manifold member 87 is preferably fabricated of separable components to facilitate cleaning of the internal orifice system. Thus, manifold 87 may suitably have removable portion 97, the portions being held together as a unit by a bolt or screw means. The configuration of manifold 87 is not critical; however, circular or rectangular configurations are preferred to facilitate easier balancing of the runner and mold systems.

In the compression stage of the molding cycle, the mold faces, such as 41 and 47, are completely closed. The mold closing pressure and heat supplied by heat plates 23 and 45 are sufficient to cure the thermosetting material enclosed in the mold cavity to form a cured article.

After curing, the movable platen assembly is retracted, moved away from the stationary assembly, to allow removal of the molded article and cleaning of the mold face areas. In the embodiment shown in FIG. 4, the only loss is the amount of cured material in the gate area, which is removed with the molded article. The material in the nozzle and manifold is maintained in a plasticized, substantially uncured, state, ready to be utilized in the next fill stage of the molding cycle.

FIG. 4 also illustrates a further embodiment of the present invention, wherein sprue member 21 is separated from stationary heat plate 23 by space 99 to aid in preventing a temperature in the sprue member which would cure, or set-up, the thermosetting molding material in sprue orifice 19. A further embodiment, illustrated in FIG. 4, is that sprue member 21 may also be provided with a temperature-control means, provided by orifices, such as 101, adapted to hold and circulate a reservoir of liquid, suitably water, maintained at a temperature sufficient to maintain the molding material in a plasticized state and insufficient to cause substantial curing of the molding material.

Figure 5:
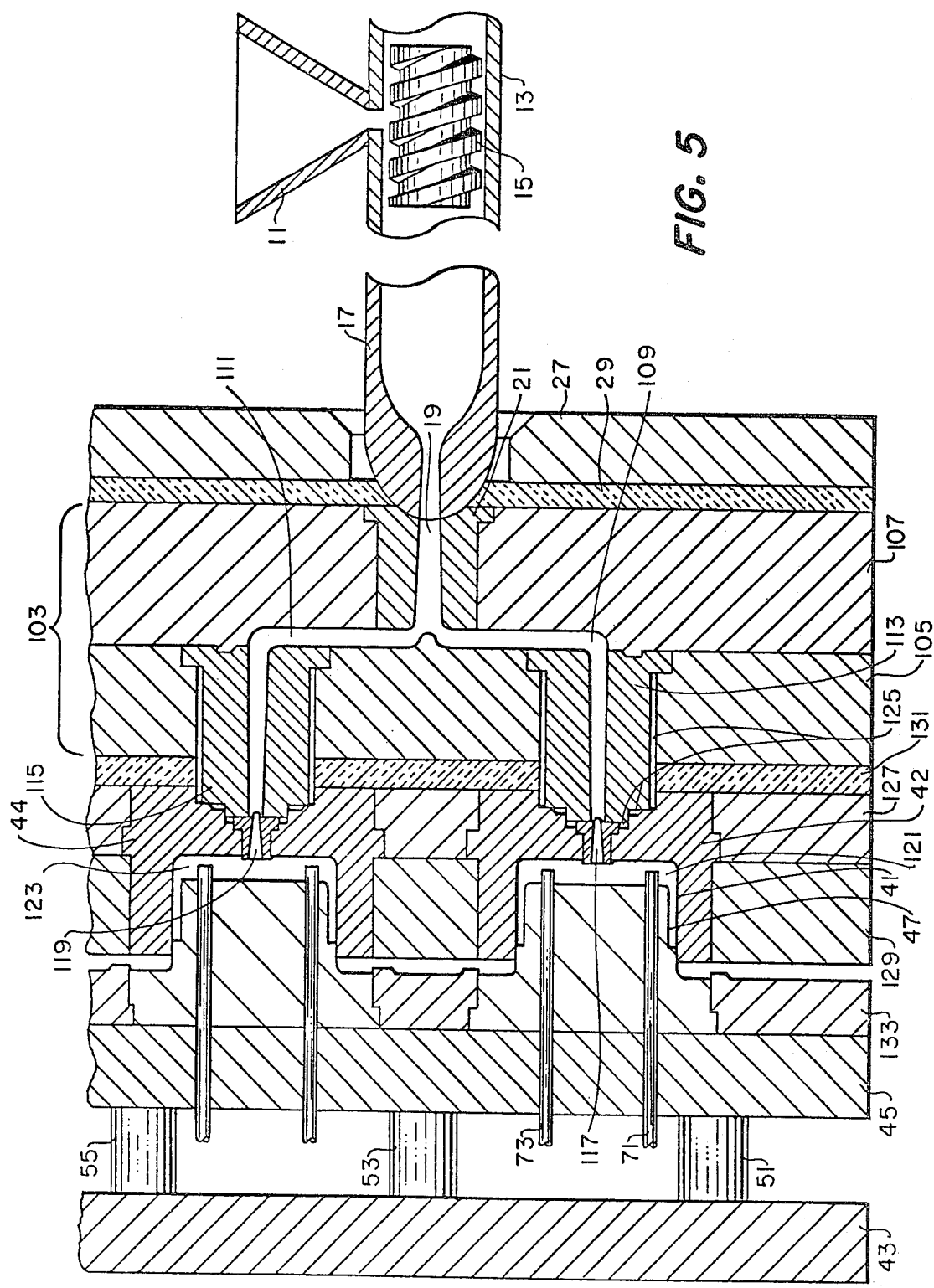
FIG. 5 is a cross-sectional, partly schematic view of an injection molding apparatus showing an alternate embodiment wherein the manifold component feeds through separate sprue bushings and runner channels into the mold cavities.

FIG. 5 illustrates a modification of the manifold arrangement shown in FIGS. 1 through 3. In FIG. 5, the manifold member 103 is equipped with separate sprue bushings, such as 113 and 115 as outlet orifices to feed thermosetting molding material through a short runner channel, such as 117, into the mold cavities. As shown in FIG. 5, the injection molding apparatus is in the fill or injection stage of the molding cycle. In this stage, thermosetting molding material enters sprue bushing 21 and into temperature-controlled manifold 103. For ease of fabrication and cleaning manifold member 103 preferably consists of separable parts 105 and 107. The thermosetting molding material entering manifold 103 is directed through distribution orifices, such as 109, and 111, and exits through temperature-controlled sprue bushings, such as 113 and 115. The thermosetting molding material then passes through short runner channels, such as 117 and 119, which, in turn, connect with the mold cavities, such as 121 and 123. The orifices in sprue bushings 113 and 115 taper to a slightly narrower opening at the point of contact with the runner channels, and the runner channels taper to a slightly narrower opening at the point of contact with the orifice in the sprue bushings. As a further aid in maintaining the desired temperature in outlet sprue bushings, such as 113 and 115, especially during the injection and compression stages, the sprue bushings may be separated along at least a portion of the outer periphery of the bushings from direct physical contact with heated molds such as 42 and 44 and, if desired, from manifold 103 by spaces, such as 125.

In the mode shown in FIG. 5, manifold member 103, which includes inlet sprue bushing 21 and outlet sprue bushings 113 and 115, is maintained at a temperature sufficiently high to maintain the thermosetting molding material in a plasticized condition but sufficiently low to avoid any substantial curing or setting of the material.

Generally, temperatures in the range between about 77° and about 121° C. and, more preferably, between about 99° and about 116° C. are useful. Manifold member 103 may be maintained with the desired temperature range by the internal circulation of a temperature-controlled liquid, such as water, through the manifold member. The components of the stationary platen assembly in this mode are stationary support plate 27, manifold member 103, heat plate 127, heated retainer plate 129 and mold face 41. Preferably, manifold member 103 is separated from stationary support plate 27 by insulation layer, such as 29, and from heat plate 127 by insulation layer, such as 131. It will be understood that heat plate 127 and heated retainer plate 129 may be fabricated as a single component. Heater plate 127 and retainer plate 129 are positioned around the periphery of mold faces, such as 41, and supply sufficient heat to the mold face areas to cure the thermosetting molding material in the mold cavities during the compression step. The movable platen assembly consists of movable support plate 43, heat plate 45, if desired, a retainer plate, such as 133, and mold faces, such as 47. Preferably, support plate 43 is separated from heat plate 45 by blocks, such as 51, 53 and 55.

After the injection stage, as shown in FIG. 5, the movable platen assembly is moved toward the stationary platen assembly applying sufficient heat and pressure to cure the thermosetting molding material within the mold cavities. The molding material within the runner channels, such as 117, is also cured, blocking further backflow through the system. After curing, the movable assembly is moved away from the stationary assembly to expose the mold faces. The thermosetting material cured in the runner channels separates from the uncured thermosetting material at or near the junction of the runner channels and the temperature-controlled sprue bushings and is removed with the molded article. The molded article, in turn, is removed from the movable assembly by means of knock-out pins, such as 71 and 73.

Although, for purposes of simplicity, the present invention has been described in terms of a horizontal clamping arrangement, it will be appreciated and understood that the invention is equally adapted to, and useful in, vertical clamping arrangements.

The foregoing description and embodiments are intended to illustrate the invention without limiting it thereby. It will be understood that various modifications can be made in the invention without departing from the spirit or scope thereof.

In the above-described drawings the visible edges and exposed surfaces behind the cutting plane have been omitted in the vicinity of the mold cavities to simplify the drawings and facilitate the understanding of the apparatus of the invention.

What is claimed is:

1. A method of injection-compression molding an article from thermosetting material comprising the steps of:
    (a) plasticizing a predetermined amount of thermosetting molding material,
    (b) passing said amount of plasticized molding material through a temperature-controlled zone maintained at a temperature sufficiently low to prevent substantial curing of the molding material and sufficiently high to maintain the molding material in a plasticized condition,
    (c) dividing said plasticized molding material within said temperature-controlled zone into two or more streams,
    (d) injecting said streams into two or more partially open mold cavities to partially fill the space between the mold faces, said mold cavities being maintained at a temperature sufficient to cure said molding material,
    (e) completely closing said mold faces to compress and cure the molding material in the internal configuration of said mold but not in said temperature controlled zone, and
    (f) removing the cured, molded article from the mold.

2. The method of claim 1 wherein the thermosetting molding material is a phenolic resin molding composition.

3. The method of claim 1 wherein the thermosetting molding material is an epoxy resin molding composition.

4. The method of claim 1 wherein the thermosetting molding material is an unsaturated polyester resin molding composition.

5. The method of claim 1 wherein the thermosetting molding material is a diallylphthalate molding composition.

* * * * *